United States Patent
DeKoning et al.

(10) Patent No.: US 6,178,520 B1
(45) Date of Patent: Jan. 23, 2001

(54) SOFTWARE RECOGNITION OF DRIVE REMOVAL OR INSERTION IN A STORAGE SYSTEM

(75) Inventors: Rodney A. DeKoning, Wichita; Marlin J. Gwaltney, Augusta; Timothy R. Snider, Derby, all of KS (US)

(73) Assignee: LSI Logic Corporation, Milpitas, CA (US)

( * ) Notice: Under 35 U.S.C. 154(b), the term of this patent shall be extended for 0 days.

(21) Appl. No.: 08/904,444

(22) Filed: Jul. 31, 1997

(51) Int. Cl.$^7$ .................................................. G06F 11/00

(52) U.S. Cl. ................................................ 714/5; 711/114

(58) Field of Search ............................ 395/182.03, 828, 395/835, 837, 838, 839, 181, 857–859, 182.05, 182.06, 183.01, 183.18, 183.19, 183.2, 183.22, 185.01, 185.07, 185.09, 185.1; 371/40.15, 49.1, 51.1, 67.1, 10.2; 364/238.3, 238.4; 711/115, 120, 114, 119, 133; 714/5, 2, 7, 8, 13, 25

(56) References Cited

U.S. PATENT DOCUMENTS

| | | | |
|---|---|---|---|
| 4,905,281 | * | 2/1990 | Surjaatmadja et al. ................ 380/25 |
| 5,101,492 | * | 3/1992 | Schultz et al. ........................ 395/575 |
| 5,195,100 | * | 3/1993 | Katz et al. .............................. 371/66 |
| 5,210,860 | * | 5/1993 | Pfeffer et al. ........................ 395/575 |
| 5,233,618 | * | 8/1993 | Glider et al. ......................... 371/68.1 |
| 5,274,645 | * | 12/1993 | Idelman et al. ..................... 371/10.1 |
| 5,369,758 | * | 11/1994 | Larson et al. ........................ 395/575 |
| 5,371,743 | * | 12/1994 | DeYesso et al. ...................... 371/8.1 |
| 5,430,747 | * | 7/1995 | Jibbe et al. .......................... 371/57.1 |
| 5,448,719 | * | 9/1995 | Schultz et al. .................... 395/182.03 |

(List continued on next page.)

FOREIGN PATENT DOCUMENTS

0426185A3 * 11/1990 (EP) .
0559454A1 * 3/1993 (EP) .
0585082A2 * 8/1993 (EP) .
0768599A1 * 10/1996 (EP) .

OTHER PUBLICATIONS

Cheryl Gerber, Raidware allows disk swapping on the fly, Micropolis Corp,'s Raidware 2.0 software, InfoWorld, IAC Trade & Industry Database, v14, p33(1), Nov. 1991.*

(List continued on next page.)

Primary Examiner—Robert W. Beausoliel, Jr.
Assistant Examiner—Nadeem Iqbal

(57) ABSTRACT

A method for detection of hot-swap of disk drives in a storage subsystem devoid of special circuits for such detection and for buffering of bus signals. Typical prior designs utilize special circuits such as disk drive canisters for physically and electronically connecting the disk drives to the storage subsystem. These canisters provided electronic buffering to reduce or eliminate transient (noise and glitch) signals associated with hot-swap drive removal and insertion. In addition, such canisters provided special purpose circuits to inform storage subsystem control modules that a possible insertion or removal occurred by forcing a reset of the interconnection bus in response to detection of such transient signals. The present invention provides for such detection without need for such complex (e.g., costly) special purpose circuits. Specifically, for example in a RAID subsystem using a SCSI interface to interconnect control modules with disk drives, the methods of the present invention detect a possible removal of a disk drive either by periodically polling the SCSI IDs of the RAID subsystem for changes therein or by resetting the SCSI interface in response to errors in processing I/O activity to a removed disk drive. Other methods of the present invention detect insertion of disk drives, either added disk drives or re-inserted disk drives, by periodically polling the SCSI IDs of the RAID subsystem. The methods of the present invention thereby detect hot-swap disk drive insertion and removal without complex (costly) custom circuits therefor.

30 Claims, 5 Drawing Sheets

U.S. PATENT DOCUMENTS

| | | | | |
|---|---|---|---|---|
| 5,479,653 | * | 12/1995 | Jones | 395/182.03 |
| 5,502,836 | * | 3/1996 | Hale et al. | 395/497.01 |
| 5,522,031 | * | 5/1996 | Ellis et al. | 395/182.04 |
| 5,548,712 | * | 8/1996 | Larson et al. | 395/182.05 |
| 5,553,230 | * | 9/1996 | Petersen et al. | 395/180 |
| 5,572,661 | * | 11/1996 | Jacobson | 395/182.05 |
| 5,586,250 | * | 12/1996 | Carbonneau et al. | 395/183.2 |
| 5,598,528 | * | 1/1997 | Larson et al. | 395/182.05 |
| 5,617,425 | * | 4/1997 | Anderson | 371/10.2 |
| 5,644,695 | * | 7/1997 | Blaum et al. | 395/182.04 |
| 5,652,832 | * | 7/1997 | Kane et al. | 395/181 |
| 5,729,552 | * | 3/1998 | Yorimitsu | 371/21.1 |
| 5,740,397 | * | 4/1998 | Levy | 395/441 |
| 5,751,936 | * | 5/1998 | Larson et al. | 395/182.05 |
| 5,752,257 | * | 5/1998 | Ripoll et al. | 711/114 |
| 5,784,644 | * | 7/1998 | Larabell | 395/829 |
| 5,790,782 | * | 8/1998 | Martinez et al. | 395/185.07 |
| 5,809,224 | * | 9/1998 | Schultz et al. | 395/182.05 |
| 5,812,761 | * | 9/1998 | Seki et al. | 395/185.07 |
| 5,822,782 | * | 10/1998 | Humlicek et al. | 711/170 |
| 5,826,046 | * | 10/1998 | Nguyen et al. | 395/309 |
| 5,832,200 | * | 11/1998 | Yoda | 395/182.04 |
| 5,835,700 | * | 11/1998 | Carbonneau et al. | 395/183.2 |

OTHER PUBLICATIONS

Steve Rigney, Xistor more without Raiding your budget, Xistor mass–storage device, IAC computer database, PC magzine, v15, pp. 1–2, Feb. 1996.*

Logan Harbaugh, Lynx offers Expandable storage–Artecon's modular array offers both fixed and hot–swappable drive units, Dialog, Informationweek, pp. 80–81, Nov. 1998.*

M2 Communications, HP redefines storage market with new line of 5.2 GB–based magneto–optical Jukeboxes, IAC Newletter, pp. 1–2, May 1998.*

Steve G. Clegg, A raid that really Stacks Up, McGraw–Hill Publications, pp. 50–51, Apr. 1996.*

Tom Henderson, Raid hits main street. (Evaluation of seven RAID software and hardware products), IAC computer database, pp. 147–154, Aug. 1994.*

J.B Miles, Raid Subsystems (Technology Information), IAC computer database, pp. 53–64, Sep. 1998.*

Reddy et al., Gracefully degradabale disk arrays, Fault tolerant computing, 1991, 21st. Internaltional Symposium, pp. 401–408, May 1991.*

Lee et al., Double parity sparing for performance Improvement in Disk arrays, 1996 International conference on Parallel and distributed systems, pp. 169–174, Jun. 1996.*

* cited by examiner

SOFTWARE RECOGNITION OF DRIVE REMOVAL OR INSERTION IN A STORAGE SYSTEM

BACKGROUND OF THE INVENTION

1. Field of the Invention

This invention relates to data storage subsystems, and more particularly, to a software method operable within controllers of the data storage subsystem for "hot-swap" detection and processing of disk drive units without special purpose circuits to indicate a disk drive insertion or removal event.

2. Discussion of Related Art

Modern mass storage systems are growing to provide increasing storage capacities to fulfill increasing user demands from host computer system applications. Due to this critical reliance on large capacity mass storage, demands for enhanced reliability are also high. A popular solution to the need for increased reliability is redundancy of component level subsystems. Redundancy is typically applied at many or all levels of the components involved in the total subsystem operation. For example in storage subsystems, redundant host systems may each be connected via redundant I/O paths to each of redundant storage controllers which in turn each may be connected through redundant I/O paths to redundant storage devices (e.g., disk drives).

In managing redundant storage devices such as disk drives it is common to utilize Redundant Array of Independent Disks (commonly referred to as RAID) storage management techniques. RAID techniques generally distribute data over a plurality of smaller disk drives. RAID controllers within a RAID storage subsystem hide this data distribution from the attached host systems such that the collection of storage (often referred to as a logical unit or LUN) appears to the host as a single large storage device.

To enhance (restore) the reliability of the subsystem having data distributed over a plurality of disk drives, RAID techniques generate and store in the disk drives redundancy information (e.g., XOR parity corresponding to a portion of the stored data). A failure of a single disk drive in such a RAID array of disk drives will not halt operation of the RAID subsystem. The remaining available data and/or redundancy data is used to recreate the data missing due to the failure of a single disk drive.

The 1987 publication by David A. Patterson, et al., from University of California at Berkeley entitled *A Case for Redundant Arrays of Inexpensive Disks* (RAID), reviews the fundamental concepts of RAID technology.

RAID techniques are therefore useful to sustain storage subsystem operation despite loss of a disk drive. However, the failed disk drive must eventually be replaced to restore the highest level of reliability in the subsystem. When a disk drive in the disk array fails, replacing the failed disk drive can affect data availability. Such a physical replacement is often referred to as a swap. It is common to refer to a swap where power to the subsystem must be shut off to affect the swap as a cold swap. A warm swap is one which may not require disconnection of power, but none-the-less requires the subsystem to completely reinitialize to continue operation with the replacement drive. Data availability and user service within the storage subsystem is disrupted by cold or warm swaps of the failed disk drive, because the system is not operational. During cold swaps, the system electrical power is turned off before replacing the failed disk drive. During warm swaps, the electrical power is not turned off, however, data is unavailable because insertion of a disk drive requires the shutdown and re-initialization of the disk array data storage system.

To avoid such disruption of service, hot swaps of failed disk drives are preferred. During a hot swap of a failed disk drive the subsystem remains operational and does not require shutdown of the system. The RAID management software within the controller(s) of the subsystem compensate for the failed disk drive using the other data and/or redundancy information to provide continued data availability to the user. Some RAID management software may even substitute a pre-installed spare disk drive for the failed disk drive to restore normal operation of the LUN (e.g., a logical operation to achieve an automatic swap). The failed disk drive, however, must eventually be physically replaced, preferably via hot swap, to maintain the highest levels of security and performance within the storage subsystem.

A problem encountered by RAID systems having the hot swap feature is correct recognition of a disk drive insertion or disk drive removal event. As is common in many electronic subsystems, insertion or removal of disk drives while powered on can generate undesirable transient signals (e.g., noise or "glitches"). Such signal glitches may confuse the storage subsystems controllers and control software operable therein thereby causing erroneous or unexpected conditions within the storage subsystem. Presently known RAID system designs utilize specialized hardware and electronic circuitry to detect the disk drive insertion or disk drive removal while simultaneously filtering or otherwise processing such transient signals.

For example, present RAID systems often utilize a SCSI bus internally to interconnect the plurality of disk drives (the disk arrays) to the RAID controller(s). Such systems typically utilize additional hardware and electronic circuitry to eliminate the erroneous transient bus signals. For example, in some commercially available storage subsystems, the disk drives are mounted in a "canister" which buffers the SCSI bus interface signals from the disk drive's SCSI bus interface connections. In other words, the canister attaches to the SCSI bus and the disk drive physically mounts within the canister and connects electronically through the buffers of the canister to the SCSI bus signals. The canister includes circuits (passive and or active circuits) to buffer the signals between the disk drive's SCSI bus interface connections and the SCSI bus signal paths. These circuits help reduce or prevent occurrences of such transient (noise or glitch) signals. In addition, the canister includes circuits which automatically perform a reset of the SCSI bus in response to the detection of such transient (noise or glitch) signals generated by insertion of the canister into a hot (powered on) SCSI bus. By resetting the bus, the canister in effect notifies the higher level control functions of the RAID controller of the possibility of a drive insertion or removal by asynchronously applying a reset to the SCSI bus. The higher level control functions of the RAID controller respond to the application of a reset to the SCSI bus by polling the devices on the SCSI bus and determining which previously present devices have been removed (if any) and which new devices have been added (inserted) into the SCSI bus.

Canisters and other similar circuits for enabling hot swaps add complexity (and therefore cost) to the storage subsystem. It is therefore a problem to properly recognize hot swap disk drives without the need for complex buffer circuits between the disk drives and their interconnection communication medium (e.g., without canisters for attaching disk drives to a SCSI bus).

SUMMARY OF THE INVENTION

The present invention solves the above and other problems, thereby advancing the useful arts, by providing a software method for hot swap detection and processing without requiring special purpose circuits to aid in proper detection of disk drive insertion or removal events. In particular, the methods and structure of the present invention perform specific test sequences dependent upon the present state of activity of a disk drive to determine when and whether a faulty drive has been replaced. The test sequences are invoked at a low level of the RAID control module software (e.g., the driver level) in response to various errors possibly generated by transient signals on the bus or by removal of a disk drive. Similar test sequences are invoked at a higher level of the RAID control software to periodically poll the devices on the bus to detect recently added or removed devices.

Specifically, the methods of the present invention are based upon low level software modules within the storage controller which detect error conditions during I/O activity to a drive which has been removed during such activity. The glitches (transient signals) generated by hot swap drive insertion or removal tend to generate error conditions on the communication medium connecting the disk drives. At a minimum, the removal of a drive during activity specifically directed to that drive will cause a time-out condition within the low level device drivers of the RAID control software. In response to such error conditions, the low level device driver suspends further activity to the possibly removed device. Test sequences comprising device commands intended to elicit a response from the device identifying the devices are then generated.

The low level software modules (e.g., SCSI interface device drivers within the storage controllers) notify higher level software modules of events recognized as disk drive removals during I/O activity on the removed drive. During periods of inactivity (or activity not involving the removed device), a storage subsystem monitor function polls the drives in the array periodically to determine if a drive has been removed or replaced (e.g., reinserted or a replacement device inserted). Detection of such conditions in the subsystem monitor also generates events communicated to higher level modules in the controller for processing of a drive insertion or removal event.

Such detected events (removals, insertions, and replacements) are communicated "upstream" to higher level software modules for further processing. The higher level modules manage overall operation of the storage subsystem which relate to I/O request processing, host system interfacing, error recovery, configuration management, etc. For example, in a RAID storage subsystem, a higher level module is responsible for mapping logical addresses supplied in host I/O requests into low level physical locations on the disk array in accordance with the particular RAID management techniques employed for a particular LUN. Another high level software module may manage configuration issues relating to subdividing the disk drives in the storage subsystem into particular groups (LUNs) each with a particular RAID management level applied thereto.

The various software modules respond to disk drive insertion and removal events in a manner dependent upon the present state of activity on the disk drive. If a drive removal is detected while there is presently activity to the drive, the present activity is caused to fail so that the higher level modules will attempt to retry the operation. Further activity is suspended until higher level software determines appropriate further actions in accord with the present configuration and storage management procedures.

If a disk drive is inserted into the storage subsystem, the control software makes several decisions from information derived from the newly inserted device. The software modules determine whether the inserted disk drive is a previously removed drive reinserted into the system, or a new drive added to the system or replacing a previously removed drive.

A first determination is whether a disk drive has been removed from the subsystem. A disk drive that fails to respond to polling inquiries as to its status or fails to complete an active I/O operation is deemed to have been removed. The second determination is whether an inserted disk drive is new disk drive or a reinsertion of a previously removed disk drive. In the case of new disk drive insertions where the drive replaces a removed drive that was in use in a configured grouping (logical unit), the new disk is initialized and its content written (restored) to that of the removed drive which the new drive replaces. In the case of disk drive reinsertions, previously suspended activity to the disk drive is resumed, the disk drive is marked as failed, and the disk drive content is updated (restored from the remaining active drives and the redundancy/parity information).

Identification information regarding each disk drive in the system is maintained in the higher level software modules of the controller. The higher level software modules determine from the stored identification information whether an inserted drive is new or a re-insertion by polling the disk drive and comparing the returned identity information with the stored identity information.

It is therefore an object of the present invention to provide methods and associated structures for detecting disk drive hot swaps in a storage subsystem.

It is a further object of the present invention to provide methods and associated structures for detecting disk drive hot swaps in a storage subsystem devoid of special purpose circuits for such detection.

It is still a further object of the present invention to provide methods and associated structures for detecting a disk drive removal in an active storage subsystem devoid of special purpose circuits for such detection.

It is yet a further object of the present invention to provide methods and associated structures for detecting a disk drive insertion in an active storage subsystem devoid of special purpose circuits for such detection.

It is another object of the present invention to provide methods and associated structures for detecting a disk drive removal from a SCSI interface in an active storage subsystem devoid of special purpose circuits for such detection.

It is still another object of the present invention to provide methods and associated structures for detecting a disk drive insertion into a SCSI interface in an active storage subsystem devoid of special purpose circuits for such detection.

The above and other objects, aspects, features, and advantages of the present invention will become apparent from the following description and the attached drawing.

DETAILED DESCRIPTION OF THE PREFERRED EMBODIMENTS

Figure 1:
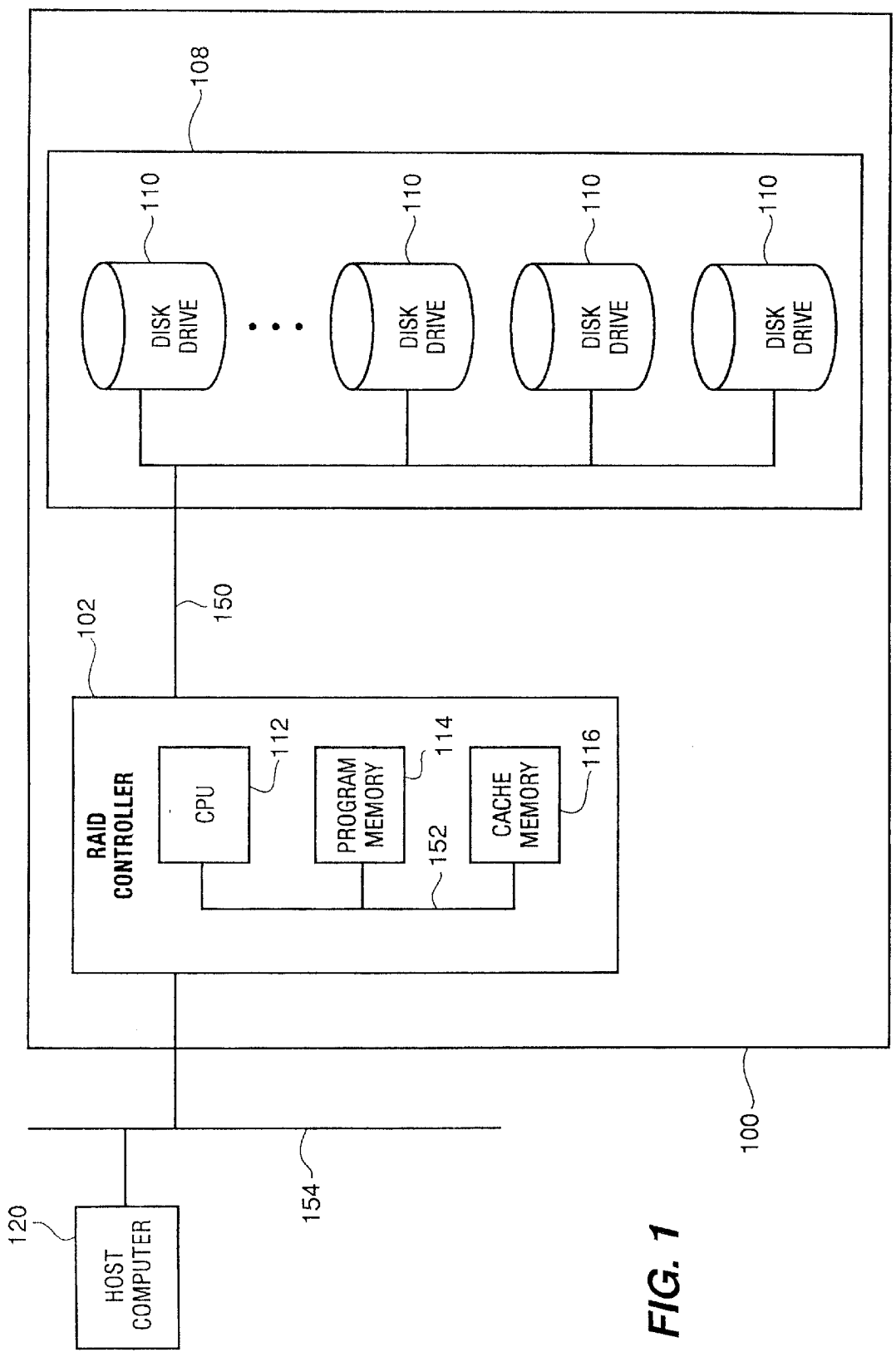
FIG. 1 is a block diagram of a typical storage subsystem in which the methods of the present invention are operable to detect disk drive swap events.

While the invention is susceptible to various modifications and alternative forms, a specific embodiment thereof has been shown by way of example in the drawings and will herein be described in detail. It should be understood, however, that it is not intended to limit the invention to the particular form disclosed, but on the contrary, the invention is to cover all modifications, equivalents, and alternatives falling within the spirit and scope of the invention as defined by the appended claims.

FIG. 1 is a block diagram of a typical storage subsystem in which the methods of the present invention may be advantageously applied. Though FIG. 1 and the remainder of this detailed description focus on application of the present invention to RAID storage subsystems, those skilled in the art will recognize that the methods of the present invention may be similarly applied to other storage subsystems devoid of RAID management techniques. The subsystem of FIG. 1 and the following descriptions are exemplary of one application of the best presently known mode of practicing the present invention.

RAID storage subsystem 100 (of FIG. 1) includes RAID controller 102 which is in turn connected to disk array 108 via bus (or buses) 150 and to host computer 120 via bus 154. Disk array 108 is comprised of a plurality of disk drives 110. One of ordinary skill in the art will readily recognize that interface bus 150 between RAID controller 102 and disk array 108 (including disk drives 110) may be any of several industry standard interface busses including SCSI, IDE, EIDE, IPI, Fiber Channel, SSA, PCI, etc. Circuits (not shown) within RAID controller 102 appropriate to controlling bus 150 are well known to those of ordinary skill in the art. For purposes of further discussion herein, bus 150 is presumed to be a medium appropriate for SCSI command sequences and therefore may be synonymously referred to herein as path 150 or simply as a SCSI interface. A parallel SCSI bus is exemplary of such a medium as is Fibre Channel and other well known media. Interface bus 154 between RAID controller 102 and host computer 120 may be any of several standard industry interface media including SCSI, Ethernet (LAN), Token Ring (LAN), etc. Circuits (not shown) within RAID controller 102 appropriate to controlling bus 154 are well known to those of ordinary skill in the art.

As shown in FIG. 1, RAID storage subsystem 100 may be applied to implement any of the well known RAID levels (e.g. levels 1–5). The various RAID levels are distinguished by the manner in which RAID controller 102 logically subdivides or partitions the disk drives 110 in disk array 108. For example, when implementing RAID level 1 features, approximately half of the disk drives 110 of disk array 108 are used to store and retrieve data while the other half is operated by RAID controller 102 to mirror the data storage contents of the first half. Further, when implementing RAID level 4 features, RAID controller 102 utilizes a portion of the disk drives 110 in disk array 108 for the storage of data and the remaining disk drives 110 are utilized for the storage of error checking/correcting information (e.g. parity information). As noted, the methods of the present invention are applicable to any storage subsystem in which disk drives may be hot-swapped (i.e., inserted into and/or removed from the subsystem with power applied thereto without significant disruption of access to data stored in the subsystem).

RAID controller 102 includes CPU 112, program memory 114 (e.g. ROM/RAM devices for storing program instructions and variables for the operation of CPU 112), and cache memory 116 for storing data and control information related to the data stored in disk array 108. CPU 112, program memory 114, and cache memory 116 are connected via memory bus 152 to enable CPU 112 to store and retrieve information in the memory devices. The methods and associated data structures of the present invention are embodied within program memory 114 and are operable within CPU 112. One of ordinary skill in the art will readily recognize that the block diagram of FIG. 1 is intended only as an exemplary design which may embody the present invention. Many alternate controller and subsystem designs may embody the methods and associated apparatus and structures of the present invention.

Figure 2:
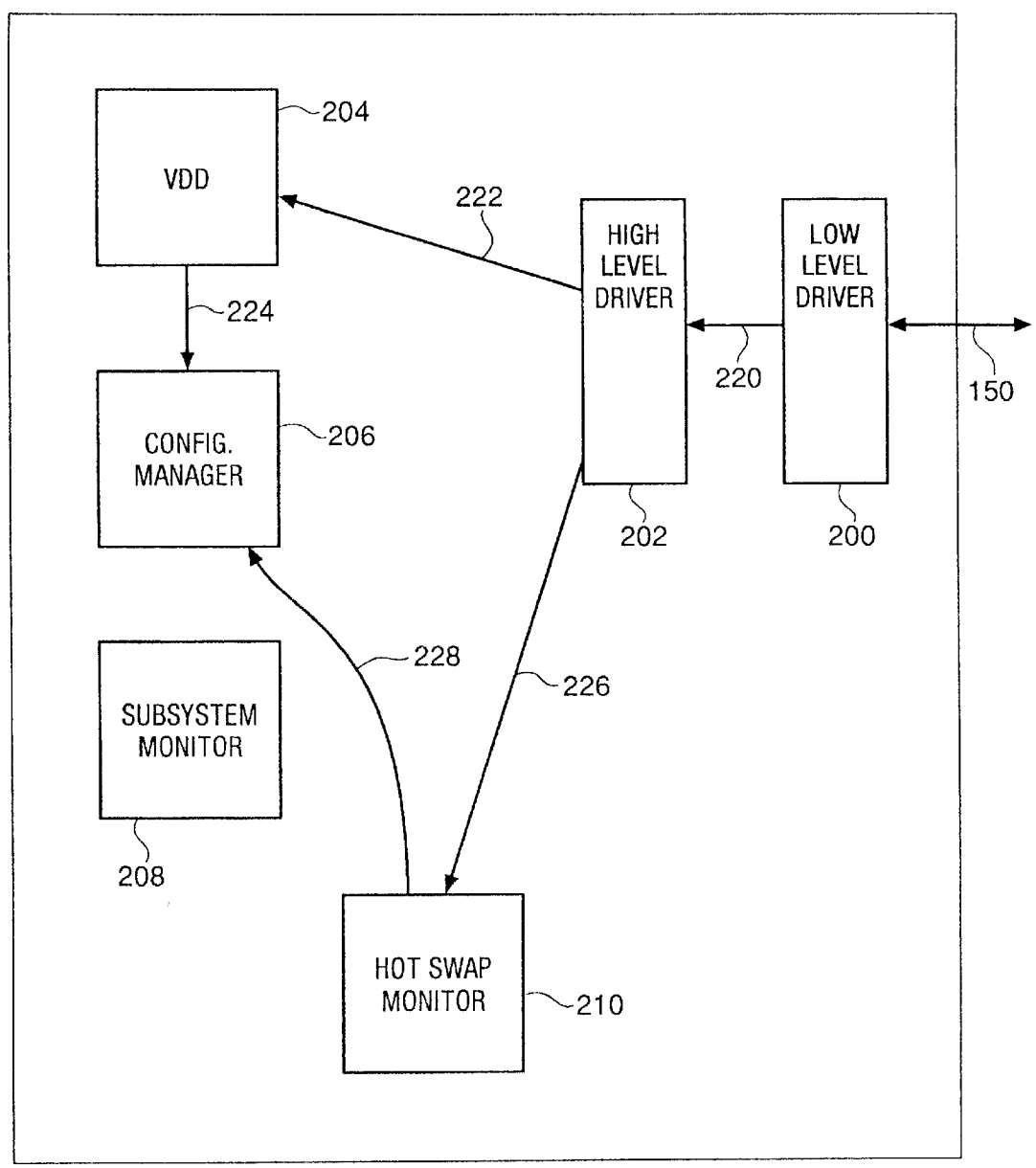
FIG. 2 is a block diagram of exemplary software modules operable in accordance with the methods of the present invention to detect disk drive swap events while an I/O request is presently active on the swapped disk drive.

FIG. 2 is a block diagram of the modules operable within RAID controller 102 of FIG. 1 and the flow of information therebetween in performing the methods of the present invention. The elements of FIG. 2 represent the best presently known mode of decomposing the tasks of storage management associated with the methods of the present invention. Those skilled in the art will recognize a wide variety of modular decompositions and structure which may achieve the same purposes in conjunction with the methods of the present invention.

FIG. 2 presents exemplary modules operable within controller 102 and connected to a plurality of disk drives 110 in disk array 108 via path 150. The modules depicted in FIG. 2 are those which relate to the methods of the present invention. Other modules may be operable within controller 102 for performing other control functions within the subsystem 100. In addition, the modules depicted may be responsible for a number of functions within the subsystem 100 beyond those described herein with respect to the methods of the present invention.

The arrows connecting various modules are described below and indicate the sequence of steps in the flow of information among the various modules to effectuate the methods of the present invention. In particular, FIG. 2 describes the steps involved in operation of the methods of the present invention to recognize or detect removal of a disk drive while I/O activity is in process for the removed disk drive. Before describing the specific information flow among the modules of FIG. 2, the following description provides an overview of the functions of each of the modules (as it relates to the hot-swap detection methods of the present invention).

Low level driver 200 (LLD) is responsible for the lowest level operations specific to the control of path 150. LLD 200 is the only module within controller 102 with detailed, specific understanding of the operations required to control the SCSI interface. Typically, LLD 200 controls the SCSI interface via any of several well known commercially available interface controller circuits. LLD 200 therefore generates commands for and receives responses from the SCSI interface chip.

High level driver 202 (HLD) provides a standardized interface (API) for higher level modules to interact with the disk drives. High level driver 202 is independent of the particular LLD 200 utilized. HLD 202 (and all other modules yet to be described in FIG. 2) are independent of the particular structure and operation of path 150 and the particular operations of LLD 200 to control path 150. HLD 202 and low level driver 200 exchange information in accordance with a standardized programming interface (API) which allows HLD 202 to be used with any of several LLDs 200 (e.g., low level drivers adapted for other possible buses 150 such as IDE, EIDE, etc.).

Virtual Disk Driver 204 (VDD) provides the virtual mapping functions to map user supplied virtual block addresses into particular physical blocks of particular disk drives. In other words, VDD 204 maps the user supplied linear address space for a particular group of disk drives (e.g., a RAID LUN) to the appropriate physical locations depending upon the storage management techniques applied thereto (e.g., RAID level and particular configured drives for a particular RAID LUN). Once so mapped, I/O requests are translated into appropriate block transfer requests and transferred to the HLD 202 for operation. A large number of such requests may be queued within HLD 202. HLD 202 returns completion status for each such request to VDD 204. The completion status may indicate success or failure of the request as appropriate. A failed request is retried in due course by VDD 204 in accordance with RAID configuration management and the hot-swap methods of the present invention. In other words, when the methods of the present invention sense a hot-swap of a defective device has been accomplished, failed operations may be retried by VDD 204.

Configuration manager 206 (CM) creates and maintains information regarding the present configuration of devices within the storage subsystem. In particular, for RAID subsystem 100, CM 206 maintains the present RAID geometry information. The RAID geometry information includes information regarding which disk drives are used in which LUNs and the RAID management techniques associated with operation of each LUN. In response to disk drive hot-swap operations, CM 206 updates its configuration information. The configuration information is used by VDD 204, among other purposes, in mapping logical addresses to physical addresses.

Subsystem monitor 208 (SSM) performs periodic polling of the disk drives of the subsystem in accordance with the methods of the present invention to detect disk drive hot-swaps not detected by other methods of the present invention. SSM 208 performs a number of other functions within subsystem 100 having no bearing on the methods of the present invention. With regard to the hot-swap detection of the present invention, SSM 208 periodically polls all possible devices on path 150 via functions invoked through HLD 202. In particular for example, each possible SCSI ID (device) on path 150 is probed using identification commands (e.g., SCSI Test Unit Ready and Inquiry commands on a SCSI interface) to determine what devices are present at each possible SCSI ID on path 150. Those skilled in the art will recognize a variety of other commands which may be utilized as appropriate for a particular medium used for path 150. Among other information, the identification commands elicit identity information from the devices which are present on the bus. A unique identity value is associated with each device and returned in response to the Inquiry command. For disk devices incapable of returning unique identity information in response to a standard SCSI Inquiry command, a unique ID may be constructed and written to a reserved area of the disk to be read by the SSM 208 (or LLD 200) for purposes of identifying the device.

Hot-swap monitor 210 (HSM) receives notification of drive insertion and removal events detected by other modules in the controller 102. In response to such insertion and removal events, HSM 210 notifies configuration manager 206 (CM) of the event occurrence. CM 206 is then operable to disable use of a drive or entire LUN as required or to enable and reconfigure a LUN responsive to a drive insertion.

The arrows connecting various modules in FIG. 2 describe the flow of data and events among the components and the sequence of such events. FIG. 2 is representative of the processing of the present invention to recognize a drive removal event when there is presently I/O activity directed to the removed disk drive. First, LLD 200 detects an error condition when transacting an I/O request with the removed disk drive. Standard error recognition techniques are employed such as time-outs encountered in the I/O activity or unexpected status returned from a reinserted disk drive or newly inserted disk drive at the same position (address or ID) as the removed disk drive. Unexpected status returned from a re-inserted or newly inserted disk drive depends upon the particular devices and interconnection path 150 used to interact with those devices. In particular with regard to SCSI devices such as in a RAID storage subsystem, LLD 200 senses status such as a Unit Attention from a device or a SCSI bus reset generated by a device on the bus or by another controller commonly attached to the same bus and devices.

In response to such time-outs or unexpected status (error conditions), LLD 200 stops present activity on path 150 and suspends further activity queued within LLD 200. The presently active I/O request (which generated the error condition) is aborted and a failure status returned to the HLD 202 as indicated by arrow 220.

Next the low level driver issues commands to the disk drive that caused the error condition to determine if in fact it has been removed. In particular, SCSI Test Unit Ready and Inquiry commands are generated to determine if the disk drive is present (responds to a Test Unit Ready) and, if present, has an identical or new identity associated therewith (in reply to the Inquiry commands). As noted above, identification information may be written to, and read from, a reserved area of a disk drive for devices which cannot uniquely identify themselves in response to SCSI Inquiry commands. The HLD 202 is notified of a drive removal event if the drive fails to respond properly or responds with a different identity than previously known to the LLD 200 as further indicated by arrow 220.

HLD 202 receives the failure status for the aborted (presently active) I/O request and forwards that status to VDD 204 for further processing and possible retries as indicated by arrow 222. VDD 204 notifies CM 206 that the disk drive which produced the error condition may have permanently failed as indicated by arrow 224. CM 206 responds to the notification by determining whether and how the present configuration may be altered to continue operation of the subsystem (i.e., reconfigure the RAID LUN containing the failed disk drive to degraded mode operation). In addition, HLD 202 passes along the notification of a disk drive removal event received from LLD 200 to HSM 210 as indicated by arrow 226. HSM 210 notifies CM 206 of the drive removal event. CM 206, in turn, determines whether another drive may be used to replace the data on the removed disk drive. In general, CM 206 determines whether and how the present configuration may be modified to continue operation of the subsystem (i.e., reconfigure the RAID LUN containing the removed disk drive) as indicated by arrow 228.

LLD 200 detects a new disk drive insertion in essentially the same manner and notifies the higher level modules (via HLD 202) of the disk drive insertion event. In a quiesce system, a disk drive removal is detected by SSM 208 periodically polling. Later insertion of a disk drive would normally also be detected by SSM 208 polling in such a quiesced system. However, if a disk drive is removed and inserted before SSM 208 polling detects the events and new I/O requests are initiated to the device, only LLD 200 will notice the changed status of the drives via assertion of a SCSI Power On Unit Attention condition on the newly inserted disk drive. A disk drive insertion event is detected when LLD 200 receives identity information in response to issued commands which does not match any previously identified disk drives. HLD 202 notifies HSM 210 of the insertion event which in turn cooperates with CM 206 to determine whether and how the subsystem should be reconfigured in response to the newly inserted or reinserted disk drive.

Figure 3:
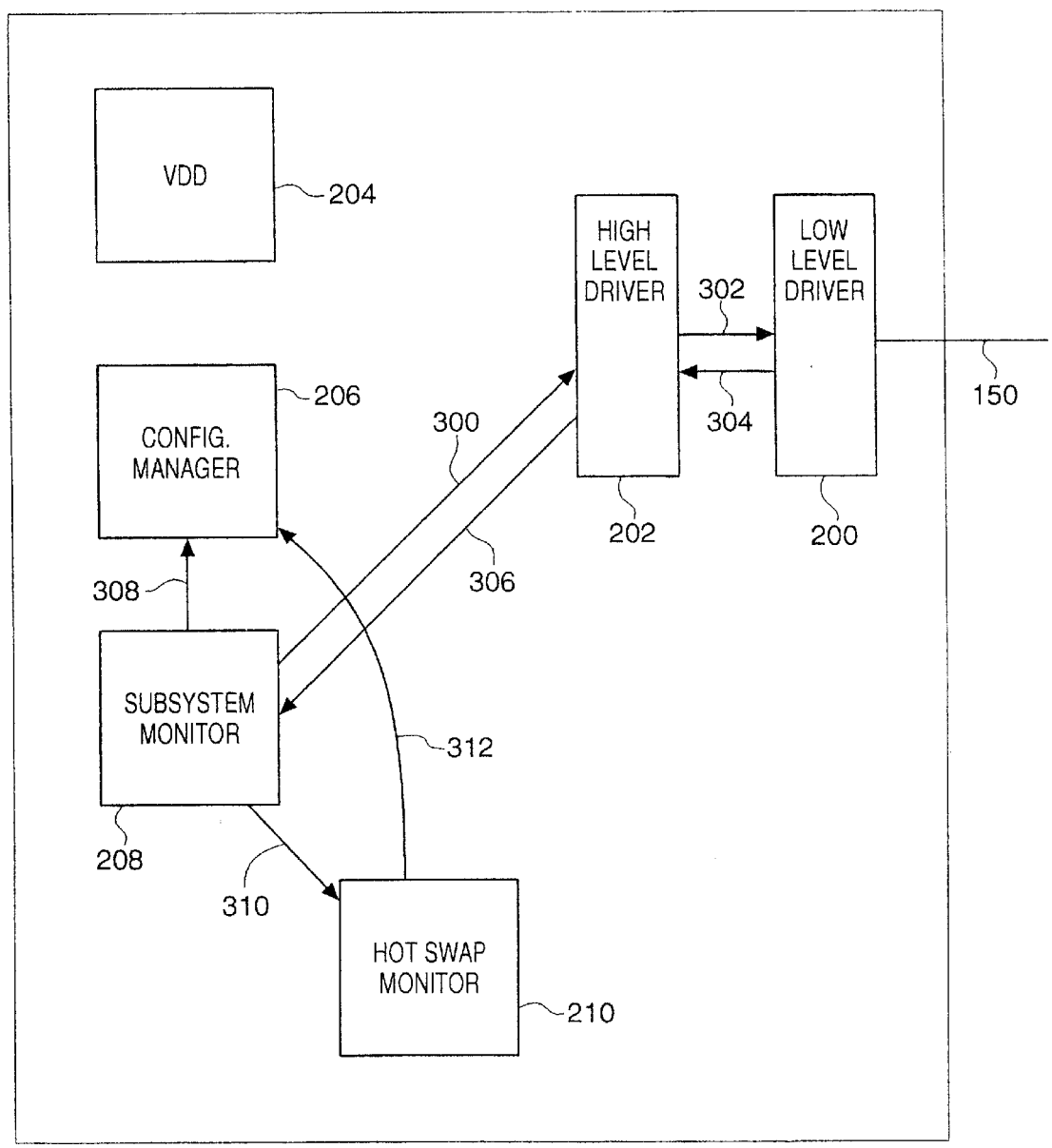
FIG. 3 is a block diagram of exemplary software modules operable in accordance with the methods of the present invention to detect disk drive swap events by polling methods while no I/O request is presently active on the swapped disk drive.

FIG. 3 is a block diagram of the same modules shown in FIG. 2 as operable in accordance with the methods of the present invention to detect disk drive insertion or removal events when there is presently no activity. As in FIG. 2, the arrows between various modules indicate the flow and sequence of information between the various modules. FIG. 3 describes the module operation where no I/O requests are presently active in the controller 102 such that the error recovery of LLD 200 would not detect disk drive removal.

As distinct from the activity case presented in FIG. 2, SSM 208 of FIG. 3 periodically polls all possible devices in the subsystem to determine which devices are present (responding to the polls) and to determine the identity of those found to be present. Arrows 300 and 306 indicated the polling requests and responses. HLD 202 and LLD 200 communicate as required to test the devices in accordance with the SSM 208 polling requests. Arrows 302 and 304 reflect such interaction to poll each device and return a response to the commands.

In the preferred embodiment, an environmental monitoring and storage device (not shown) maintains environmental information regarding the subsystem for use by any of the modules of the subsystem. This globally accessible environmental information includes the identity of all disk drives presently known to be in the subsystem. This device, also referred to herein as an environmental services card or module, may be viewed logically as an extension of the controller though physically separated from the controller (residing with associated disk drives). For packaging and usability reasons, an environmental services card is associated with each physical grouping of disk drives (e.g., in a mounting bay adapted for a plurality of disk drives). The environmental services card actually performs the low level operations required to detect insertion or removal of a disk drive in the storage module group with which the card resides. SSM 208 and LLD 200 actually read information from the environmental service module associated with a group of disk drives rather than individually reading information from each disk drive. The environmental services card is preferably a SCSI device or FC-AL device analogous to any other disk drive in the subsystem. SSM 208 and LLD 200 both communicate with the environmental services card just as though communicating with any other disk drive in the group housing the environmental services card. Though the environmental services card of the preferred embodiment aids in detecting drive removals and insertions, it does not, for example, actively control bus resets nor filter signal lines on the bus. Rather, it performs requisite periodic polling of its associated devices to aid SSM 208 and LLD 200 in performing the methods of the present invention. In addition, the environmental services module helps monitor other environmental matters associated with proper operation of the module in which it is housed. The environmental services module is a substantially simpler device than the complex devices of prior techniques (e.g., canisters) associated with each disk drive. The methods of the present invention are therefore applicable in this, the preferred embodiment as well as more generally applicable where each disk drive (e.g., each SCSI interface ID) is scanned by the methods of the present invention to detect disk drive insertion or removal.

SSM 208 notifies HSM 210 as indicated by arrow 310 of changes in the disk drives present in the subsystem. SSM 208 detects the changes by comparing the responses to its periodic polls against the previously stored identities of the disk drives in the subsystem. Any changes reflect disk drive insertions or disk drive removals. As above, with respect to FIG. 2, HSM 210, in turn, notifies CM 206 of the event as indicated by arrow 312. CM 206, in turn, determines whether and how to reconfigure the subsystem in response to disk drive insertion and removal events detected originally by SSM 208.

Methods for Detecting Disk Drive Removal/Insertion

Methods of the present invention noted above detect the removal and/or insertion of a disk drive without the need for custom circuits associated with such detection. In particular, methods of the present invention detect disk drive insertion and removal with respect to a SCSI interface connecting a storage controller to a plurality of disk drives. A first method depicted in the flowchart of FIG. 4 and operable within LLD 200 detects disk drive removal event in response to error conditions arising during I/O activity directed to the removed disk drive. A second method of the present invention depicted in the flowchart of FIG. 5 and operable within SSM 208 detects disk drive removal events, disk drive insertion events, and disk drive replacement events (a removal and insertion detected as a single swap or replacement operation) by periodically polling all possible devices in the storage subsystem.

Figure 4:
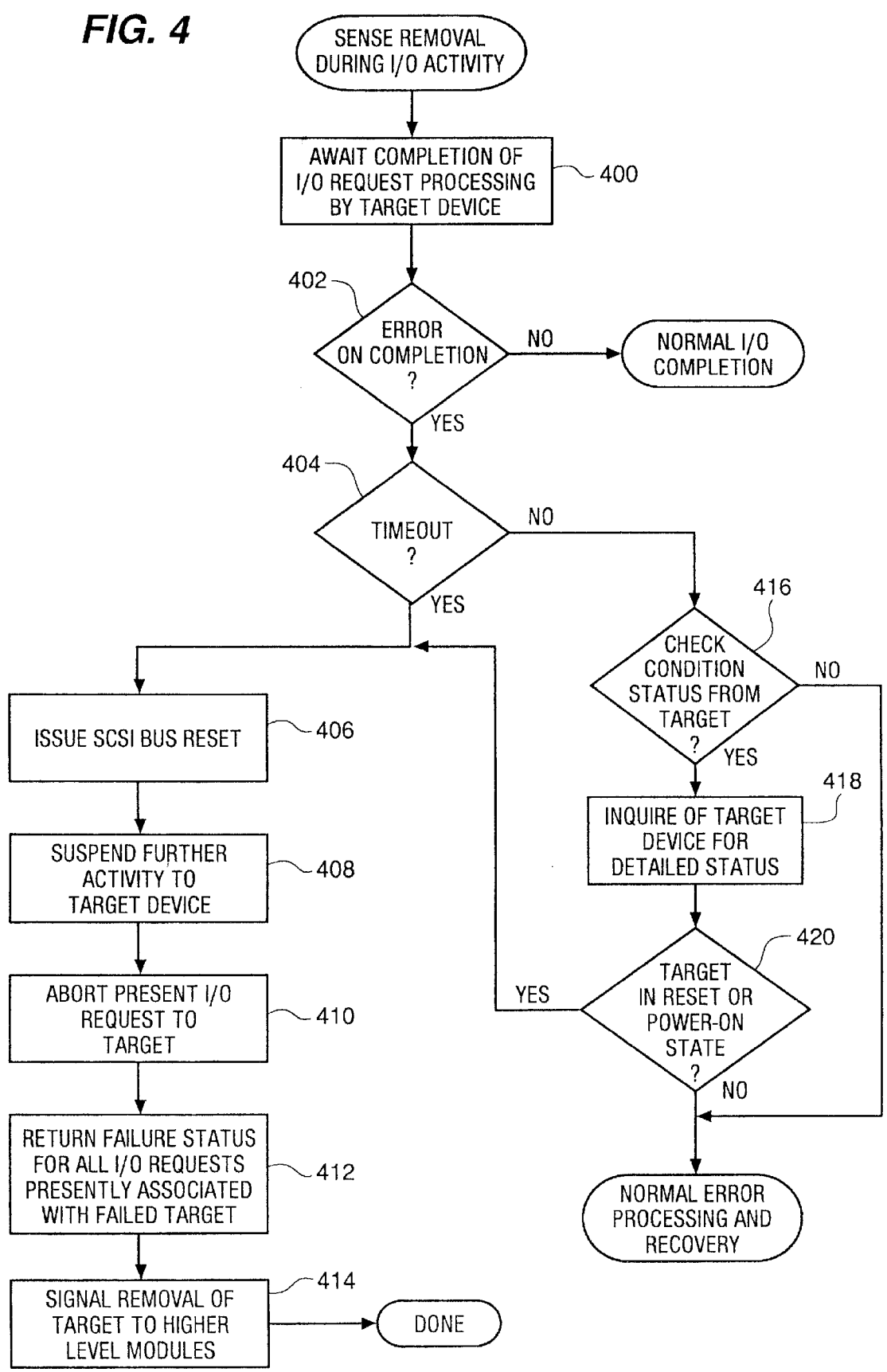
FIG. 4 is a flowchart describing operation of the methods of the present invention to detect disk drive removal events within a low level driver module while an I/O request is presently active on the removed disk drive.
Figure 5:
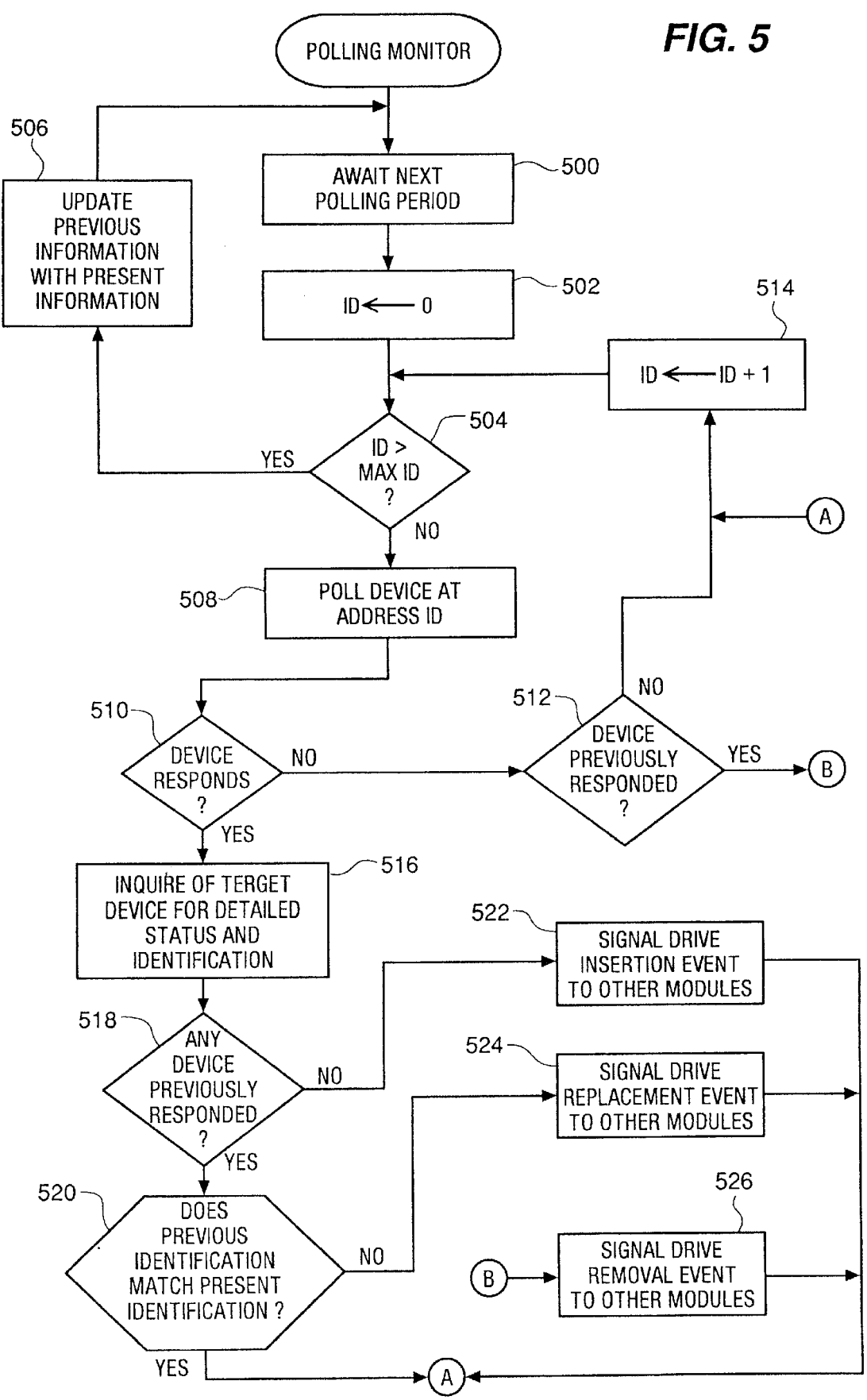
FIG. 5 is a flowchart describing operation of the methods of the present invention to detect disk drive swap events within a low level driver module using polling methods while no I/O request is presently active on the removed disk drive.

The methods of FIGS. 4 and 5 are both operable in conjunction with other modules in RAID controller 102 to process the detected disk swap events. For example as noted above, HSM 210, CM 206, VDD 204, and HLD 202 are involved in further processing of detected swap events within the storage subsystem so as to reconfigure the subsystem and/or continue operation of the subsystem in view of the change in disk drive configurations.

Element 400 of FIG. 4 is first operable to await completion of an I/O request operation previously sent to the target device by LLD 200. One skilled in the art will recognize that a wide variety of processing precedes the operation of element 400 to prepare low level I/O operations required to perform a requested I/O function and to transfer those operations to the target device. The processing described by FIG. 4 is therefore but one portion of the total processing of an I/O request. Specifically, FIG. 4 is that portion of the processing within LLD 200 which embodies the methods of the present invention.

When the present I/O request operation is completed, element 402 is next operable to determine whether any error condition was raised by the completion. For example, if the target device simply fails to respond to the operation in a reasonable period of time, a time error condition may arise. Other more specific error conditions may be returned by the completion of the I/O request operation. Each such other condition returned is indicative of a particular failure mode. Certain failure modes are indicative that the target device has been replaced (removed and either reinserted or replaced by another disk drive). For example, in a SCSI bus environment, a target device may return a Check Condition status with a more detailed status revealing either a Unit Attention Reset/Power-on condition in the target device. One skilled in the art will recognize a variety of other status indications which may indicate that a disk drive has been replaced. The particular status codes and types are specific to the selected interface path 150 used to connect the drives to the controller 102.

The I/O request operation is complete (for purposes of the methods of the present invention described in FIG. 4) when element 402 determines that the operation completed without error. If element 402 determines that the operation completed with an error status, element 404 is next operable to determine whether the particular error condition was a time-out condition or some other error status.

Elements 406–414 are operable in response to element 404 determining that the I/O request operation completed with a time-out error condition. A time-out error condition is a possible indication that the target device was removed during (or preceding) the presently active I/O operation. Element 406 therefore generates a SCSI bus reset to assure that the SCSI interface is not permanently hung due to the particular state of the bus when the target device was removed. Those skilled in the art will recognize that element 406 represents processing to reset the bus appropriate to the particular path 150 used in the storage subsystem. Different interconnection buses 150 may require different signal and protocols to perform an analogous reset operation.

Element 408 is next operable to suspend processing of any further I/O operation on the removed target device. This may involve for example setting of a global flag to indicate the removed or failed state of the target device. Element 410 then aborts the I/O operation presently active on the target device which caused the time-out error condition. Element 412 returns a failure status indication to higher level modules (e.g., HLD 202) for each I/O request operation presently queued within LLD 200 for the removed target device. Finally, element 414 signals removal of the target device to higher level modules. Well known inter-process communication techniques may be employed to transfer such signals between LLD 200 and other modules as shown in FIG. 2. The higher level modules receive the signal of the removal event and process the event accordingly. For example, CM 206 may determine that the affected LUN (the logical unit using the removed drive) is now inoperable or operable in a degraded manner. Spare drives may be hot swapped to restore full operation by CM 206 when it receives notification of a drive change event from HSM 210. Failed I/O request operations may be requeued by operation of VDD 204 to retry the failed operations when a restored configuration is made operational.

Elements 416–420 are operable in response to element 404 determining that the error status completion indicates an error other than a time-out error. Element 416 is then operable to determine whether the target device responded with a Check Condition SCSI status. If not, processing continues with normal recovery processing from some other error condition in the processing of the I/O request operation in the target device. If element 416 determines that a Check Condition status is present in the target device, element 418 is next operable to request detailed status information from the target device. For example, a SCSI Request Sense and/or Inquiry command may be used to request further detailed status information from the failed target device. Element 420 is then operable to determine whether the detailed status information reflects a Unit Attention Reset/Power-on state. These particular SCSI status messages in this context reflect an uninitialized state of the target device. Such a state is likely produced by a newly inserted drive replacing a target device which was in process performing a particular operation. If element 420 determines that such a status is present in the target device, processing continues with elements 406–414 as above to suspend activity on the failed target device and return appropriate status and signals to higher level modules in the RAID controller 102. Normal error recovery processing is performed if element 420 determines that some other status is present in the failed target device. Those skilled in the art will recognize the other bus and protocol standards may utilize similar commands to elicit detailed status information from a failed device in response to similar status conditions.

FIG. 5 describes a second method of the present invention operable substantially within SSM 208 to detect disk drive removal events, disk drive insertion events, and disk drive replacement events (a removal and insertion detected as a single swap or replacement operation) by periodically polling all possible devices in the storage subsystem.

Element 500 of FIG. 5 is operable to await a next polling period. The polling of devices is preferably scheduled to begin on timed intervals. Alternatively, a polling period may correspond to idle periods in the operation of the storage subsystem. Processing at a next polling period then begins with element 502 to initialize a local variable ID to zero (the first SCSI ID which may correspond to a device in the storage subsystem). Element 504 is then operable to determine whether ID has exceeded a MAXID value (i.e., have all devices been polled at this polling period). If so, element 506 is operable to update the previous poll information with the information determined by the present poll (as noted below). Processing then continues with element 500 to await a next polling period.

For each possible device ID in the storage subsystem, elements 508–526 are operable to determine whether a device is present at the ID value and exactly what device, if any, is present. Element 508 first polls the device at address ID in the subsystem. For example, a SCSI Test Unit Ready command may be generated in the lower level modules of the controller (e.g., HLD 202 and LLD 200) and applied to the target device at SCSI address ID. Polling information, as noted below, regarding the results of the present polling period is updated to reflect the result of issuing a poll sequence to device ID. Specifically, the polling information is updated to reflect whether or not a device responded to the poll of device ID.

Element 510 then tests the polling result to determine if any device at SCSI address ID responded to the polling attempt. If no device responds to the polling attempt, processing continues with element 512 to determine if some device responded to the previous polling period's poll of address ID. If element 512 determines that there was also no response to the device ID in the previous polling period, processing continues with element 514 to increment to the next ID value and then continues with element 504 to begin the poll process again for the next ID value.

If element 512 determines that some device responded to polls of device ID in the previous polling period, processing continues with element 526 to signal removal of that device to other modules of the controller 102 software. The specific status and identification information corresponding to the device ID which previously responded to a poll is included in the signal information conveyed to other software modules in the RAID controller. As noted above, well known inter-process communication and signaling methods are employed to provide the requisite communication among the controller software modules. Following the signaling by element 526, processing continues with element 514 and 504 as above to increment the device ID value and poll another device.

Information obtained from the present polling sequences and from the past polling sequences for each possible target device ID is stored by the methods of the present invention. For example, the present polling information and the previous polling period's polling information may each be stored as data structures in program memory 114 (RAM) of controller 102. Specifically, the polling information for each device ID includes indicia as to whether some device responded to a poll sequence at that ID value by operation of element 508 and also includes any detailed status and identification information received in response to the inquiry by operation of element 516. As noted above, element 506 copies the present polling information structure into the previous polling information structure so that information obtained in the present polling period may be compared with polling information obtained from the previous polling period.

Element 516 is operable in response to a determination by element 510 that some device responds to the polling of device ID in the present polling period. Element 516 then inquires of the responding device to obtain its present status and detailed identification information. Specifically, element 516 sends identification commands (e.g., SCSI Inquiry and/or Request Sense commands) to the responding device. The device responds with a more detailed status (if any) and with identification information which uniquely identifies the disk drive element.

Element 518 is then operable to determine whether any device responded to polls of device ID in the previous polling period. If no device previously to the poll of device ID, element 522 is operable to signal the insertion of a new disk drive. The specific status and identification information corresponding to the newly inserted device ID which responded to a poll is included in the signal information conveyed to other software modules in the RAID controller. As noted above, well known inter-process communication and signaling methods are employed to provide the requisite communication among the controller software modules. Following the signaling by element 522, processing continues with element 514 and 504 as above to increment the device ID value and poll another device.

If element 518 determines that some device previously responded to polls of device ID, then element 520 is next operable to determine whether the detailed identification information obtained in the present polling period from device ID matches the information obtained in the previous polling period. If the compared information matches, processing continues with element 514 and 504 as above to poll another device in the storage subsystem. If the compared information does not match, element 524 is operable to signal a drive swap to other modules of the controller software (replacement of a disk by removing the old and inserting a new between the present and previous polling periods). The specific status and identification information corresponding to the removed device and the information corresponding to the newly inserted device are included in the signal information conveyed to other software modules in the RAID controller. As noted above, well known inter-process communication and signaling methods are employed to provide the requisite communication among the controller software modules. Following the signaling by element 524, processing continues with element 514 and 504 as above to increment the device ID value and poll another device.

One of ordinary skill in the art will recognize that the methods of FIGS. 4 and 5 may be readily adapted for operation in the preferred embodiment wherein an environmental service card or module maintains status information about the disk drives and environment in which it resides. The methods of FIGS. 4 and 5 are thereby adapted by polling the environmental services card rather than the individual SCSI interface ID's with which the environmental services card is associated. The environmental services card then returns its presently stored status information regarding disk drives present in the system. SSM 208 or LLD 200 read this information and determine whether the information reflect a change in the present configuration of disk drives. As above, SSM 208 or LLD 200 notify HSM 210 of such changes which, in turn, notifies CM 206 and other modules in the controller software to enable appropriate response to the configuration change. Therefore, as noted above, the methods of the present invention are applicable to the preferred embodiment in which an environmental services card is present or to the more general environment wherein each device is individually interrogated to determine changes in the subsystem configuration.

While the invention has been illustrated and described in detail in the drawings and foregoing description, such illustration and description is to be considered as exemplary and not restrictive in character, it being understood that only the preferred embodiment and minor variants thereof have been shown and described and that all changes and modifications that come within the spirit of the invention are desired to be protected.

What is claimed is:

1. In a disk array storage subsystem having a plurality of disk drives, a method for detecting removal of one of said disk drives comprising the steps of: detecting an error condition in I/O activity directed to said one of said disk drives wherein the step of detecting is performed within at least one software component operable within said subsystem;

issuing commands, in response to detection of said error condition, to elicit status from said one of said disk drives wherein the step of issuing commands is performed within at least one software component operable within said subsystem; and determining that said one of said disk drives has been removed in response to status associated with said one of said disk drives wherein the step of determining is performed within at least one software component operable within said subsystem.

2. The method of claim 1 further comprising the step of:
   determining that a replacement disk drive has replaced said one of said disk drives in said storage subsystem.

3. The method of claim 2 wherein the step of determining that said replacement disk drive has replaced said one of said disk drives includes the steps of:
   determining a new identity associated with said replacement disk drive; and comparing said new identity with a previous identity associated with said one of said disk drives.

4. The method of claim 3 wherein the step of determining that said replacement disk drive has replaced said one of said disk drives further includes the step of:
   determining that said replacement disk drive is a re-inserted disk drive in response to a comparison result of equality between said new identity and said previous identity.

5. The method of claim 3 wherein the step of determining that said replacement disk drive has replaced said one of said disk drives further includes the step of:

determining that said replacement disk drive is an added disk drive in response to a comparison result of inequality between said new identity and said previous identity.

6. The method of claim 2 further comprising the step of:

reconfiguring said storage subsystem to utilize said replacement disk drive in place of said one of said disk drives.

7. The method of claim 1 wherein the step of detecting an error condition includes the step of:

sensing a time-out in performing said I/O activity.

8. The method of claim 1 wherein said storage subsystem includes a storage controller connected to said disk drives by a SCSI interface and wherein the step of detecting an error condition includes the step of:

receiving a SCSI Unit Attention condition from said one of said disk drives.

9. The method of claim 1 wherein said storage subsystem includes a storage controller connected to said disk drives by a SCSI interface and wherein the step of detecting an error condition includes the step of:

sensing a SCSI Bus Reset on said SCSI interface.

10. The method of claim 1 wherein the step of issuing commands includes the steps of:

aborting commands previously sent to said disk drive and associated with said I/O activity; and returning a failure status associated with said I/O activity to an initiator of said I/O activity.

11. The method of claim 1 further comprising the steps of:

periodically polling said disk drives to determine that new disk drives are inserted in aid storage subsystem; and reconfiguring said storage subsystem to utilize said new disk drives in response to the determination that said new disk drives are inserted.

12. The method of claim 11 wherein the step of periodically polling includes the steps of:

requesting new identity information from each of said disk drives;

receiving requested new identity information for each of said disk drives presently in said storage subsystem;

comparing said new identity information to stored identity information previously received to newly identify inserted ones of said disk drives; and replacing said stored identity information with said new identity information.

13. The method of claim 12 wherein said storage subsystem includes a storage controller connected to said disk drives by a SCSI interface and wherein the step of requesting new identity information includes the steps of:

a) issuing identification commands from said storage controller to a SCSI ID in said storage subsystem;

b) receiving at said storage controller a reply responsive to the issuance of said identification commands from said SCSI ID; and c) repeating steps a–b above for each possible SCSI ID in said storage subsystem.

14. The method of claim 12 wherein said storage subsystem includes a storage controller connected to said disk drives by a SCSI interface and wherein the step of requesting new identity information includes the steps of:

a) issuing a Test Unit Ready SCSI command from said storage controller to a SCSI ID in said storage subsystem;

b) receiving at said storage controller a reply responsive to the issuance of said Test Unit Ready SCSI command from said SCSI ID;

c) issuing a Inquiry SCSI command from said storage controller to said SCSI ID in response to receipt of a Ready reply from said SCSI ID; and d) repeating steps a–c above for each possible SCSI ID in said storage subsystem.

15. The method of claim 12 wherein said storage subsystem includes a storage controller connected to said disk drives, the method further comprising the steps of:

constructing unique identity information for at least one of said disk drives; and storing the constructed unique identity information on said at least one of said disk drives, wherein the step of requesting new identity information includes the steps of:

a) issuing identification commands from said storage controller to retrieve the stored unique identity information from one of said at least one of said disk drives;

b) receiving at said storage controller a reply responsive to the issuance of said identification commands from said one of said at least one of said disk drives; and c) repeating steps a–b above for each one of said at least one of said disk drives in said storage subsystem.

16. A computer readable storage medium tangibly embodying programmed instructions for performing a method for detecting removal of a disk drive in a disk array storage subsystem having a plurality of disk drives, the method comprising the steps of:

detecting an error condition in I/O activity directed to said one of said disk drives wherein the step of detecting is performed within at least one software component operable within said subsystem;

issuing commands, in response to detection of said error condition, to elicit status from said one of said disk drives wherein the step of issuing commands is performed within at least one software component operable within said subsystem; and determining that said one of said disk drives has been removed in response to status associated with said one of said disk drives wherein the step of determining is performed within at least one software component operable within said subsystem.

17. The storage medium of claim 16 wherein the method further comprises the step of:

determining that a replacement disk drive has replaced said one of said disk drives in said storage subsystem.

18. The storage medium of claim 17 wherein the step of determining that said replacement disk drive has replaced said one of said disk drives includes the steps of:

determining a new identity associated with said replacement disk drive; and comparing said new identity with a previous identity associated with said one of said disk drives.

19. The storage medium of claim 18 wherein the step of determining that said replacement disk drive has replaced said one of said disk drives further includes the step of:

determining that said replacement disk drive is a re-inserted disk drive in response to a comparison result of equality between said new identity and said previous identity.

20. The storage medium of claim 18 wherein the step of determining that said replacement disk drive has replaced said one of said disk drives further includes the step of:

determining that said replacement disk drive is an added disk drive in response to a comparison result of inequality between said new identity and said previous identity.

21. The storage medium of claim 17 wherein the method further comprises the step of:

reconfiguring said storage subsystem to utilize said replacement disk drive in place of said one of said disk drives.

22. The storage medium of claim 16 wherein the step of detecting an error condition includes the step of:

sensing a time-out in performing said I/O activity.

23. The storage medium of claim 16 wherein said storage subsystem includes a storage controller connected to said disk drives by a SCSI interface and wherein the step of detecting an error condition includes the step of:

receiving a SCSI Unit Attention condition from said one of said disk drives.

24. The storage medium of claim 16 wherein said storage subsystem includes a storage controller connected to said disk drives by a SCSI interface and wherein the step of detecting an error condition includes the step of:

sensing a SCSI Bus Reset on said SCSI interface.

25. The storage medium of claim 16 wherein the step of issuing commands includes the steps of:

aborting commands previously sent to said disk drive and associated with said I/O activity; and returning a failure status associated with said I/O activity to an initiator of said I/O activity.

26. The storage medium of claim 16 wherein the method further comprises the steps of:

periodically polling said disk drives to determine that new disk drives are inserted in said storage subsystem; and reconfiguring said storage subsystem to utilize said new disk drives in response to the determination that said new disk drives are inserted.

27. The storage medium of claim 26 wherein the step of periodically polling includes the steps of:

requesting new identity information from each of said disk drives;

receiving requested new identity information for each of said disk drives presently in said storage subsystem;

comparing said new identity information to stored identity information previously received to newly identify inserted ones of said disk drives; and replacing said stored identity information with said new identity information.

28. The storage medium of claim 27 wherein said storage subsystem includes a storage controller connected to said disk drives by a SCSI interface and wherein the step of requesting new identity information includes the steps of:

a) issuing identification commands from said storage controller to a SCSI ID in said storage subsystem;

b) receiving at said storage controller a reply responsive to the issuance of said identification commands from said SCSI ID; and c) repeating steps a–b above for each possible SCSI ID in said storage subsystem.

29. The storage medium of claim 27 wherein said storage subsystem includes a storage controller connected to said disk drives by a SCSI interface and wherein the step of requesting new identity information includes the steps of:

a) issuing a Test Unit Ready SCSI command from said storage controller to a SCSI ID in said storage subsystem;

b) receiving at said storage controller a reply responsive to the issuance of said Test Unit Ready SCSI command from said SCSI ID;

c) issuing a Inquiry SCSI command from said storage controller to said SCSI ID in response to receipt of a Ready reply from said SCSI ID; and d) repeating steps a–c above for each possible SCSI ID in said storage subsystem.

30. The storage medium of claim 27 wherein said storage subsystem includes a storage controller connected to said disk drives and wherein the method further comprising the steps of:

constructing unique identity information for at least one of said disk drives; and storing the constructed unique identity information on said at least one of said disk drives, wherein the step of requesting new identity information includes the steps of:

a) issuing identification commands from said storage controller to retrieve the stored unique identity information from one of said at least one of said disk drives;

b) receiving at said storage controller a reply responsive to the issuance of said identification commands from said one of said at least one of said disk drives; and c) repeating steps a–b above for each one of said at least one of said disk drives in said storage subsystem.

* * * * *